United States Patent Office 3,177,153
Patented Apr. 6, 1965

3,177,153
MACROMOLECULAR SUBSTANCES OPTICALLY BRIGHTENED WITH 1,4-BIS-STYRYL-BENZENES
Horst Pommer, Hans Peter Siebel, Roland Schwen, and Walter Stilz, all of Ludwigshafen (Rhine), Germany, assignors to Badische Anilin- & Soda-Fabrik Aktiengesellschaft, Ludwigshafen (Rhine), Germany
No Drawing. Filed Jan. 18, 1962, Ser. No. 167,155
Claims priority, application Germany, July 21, 1959, B 54,102
10 Claims. (Cl. 252—301.2)

This invention relates to macromolecular organic substances containing homogeneously distributed therein as an optical bleach a 1,4-bis-styryl-benzene free from carboxyl groups and derivatives thereof.

The homogeneous, uniform brightening of synthetic, semi-synthetic and natural macromolecular substances with optical bleaches presents to the technician considerably more difficult problems than the brightening of substrates with the aid of, for example, treatment baths or by mere admixing. The conditions under which treatment baths are used or the usual mixing is carried out are relatively mild. The optical bleach lies more or less on the surface of the substrate. When an optical bleach on a substrate has become inactive in the course of time, it can in general be removed and/or replaced by renewed treatment with fresh brightener. Defective lots can be subjected to another treatment and the defect corrected without difficulty. It is considerably more difficult, however, to brighten macromolecular substances homogeneously with a satisfactory and sufficiently lasting effect. If the optical bleach is incorporated, for example, in a monomeric polymerizable initial material or precondensate and the end product then prepared by allowing the initial material or precondensate to polymerize to form macromolecules, the optical bleach is necessarily subjected to energetic conditions and moreover often also exposed to the influence of very reactive chemicals. The homogeneous incorporation of optical bleaches in readymade macromolecular substances likewise exposes the optical bleach to incomparably higher stresses than is the case in the usual application of such compounds to substrates. The consequence is damage to the optical bleach by total or partial decomposition. The injurious influence may also become apparent in such a way that the optical bleach is very soon converted into inactive products which not only are no longer capable of imparting brightening to the macromolecular substances, but even make the said substances particularly unattractive in appearance. The removal of such undesirable products from the finished material is just as impossible as a fresh treatment for homogeneous brightening.

It is an object of the present invention to provide new compounds which are especially suitable for the optical brightening of macromolecular organic substances because they give a very durable brightening effect and are very stable. Another object of the invention is to provide homogeneous and very stable optically brightened macromolecular organic substances.

These and other objects are achieved by 1,4-bis-styrylbenzenes which contain on at least one benzene nucleus of the molecule at least one of the substituents alkyl, aryl, aralkyl, halogen, free hydroxyl, esterified hydroxyl, and etherified hydroxyl, and if desired yet further substituents but no carboxyl groups, no derivatives of carboxyl groups, and no nitrile groups.

1,4-bis-styryl-benzene has the formula:

The optically brightening 1,4-bis-styryl-benzenes of the same kind may be represented for example by the general formula:

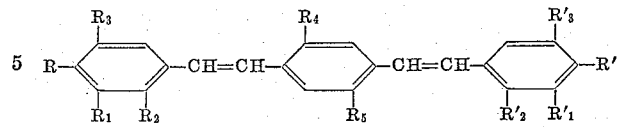

in which R, $R_1$, $R_2$, $R_3$, R′, $R'_1$, $R'_2$ and $R'_3$ may represent hydrogen, alkyl, aryl or aralkyl radicals, halogen or a hydroxyl group which may also be etherified or esterified. $R_4$ and $R_5$ represent identical or different substituents of such a kind that the maximum or maxima of the ultraviolet absorption (bands of maximum extinction, measured in dioxane) of the 1,4-bis-styryl-benzene do not exceed 380 millimicrons and the main maxima of the fluorescence spectrum lie between 390 and 450 millimicrons (measured in dioxane). Such substituents represented by $R_4$ and $R_5$ include hydrogen, halogen, alkyl, aralkyl and alkoxy groups. At least one of the radicals R, $R_1$, $R_2$, $R_3$, R′, $R'_1$, $R'_2$, $R'_3$, $R_4$ and $R_5$ represents a radical other than hydrogen. As alkyl radicals, those with 1 to 4 carbon atoms are preferred for reasons of ready accessibility. These are the methyl, ethyl, propyl and butyl radicals. Aryl radicals with an aromatic ring, i.e., benzene radicals, are preferred. The same is true of the aralkyl radicals, as which therefore the benzyl radical may be specified. The halogens chlorine and bromine are especially suitable as substituents. If hydroxyl groups on the phenyl radicals of the styryl groups or on the middle benzene ring are etherified and consequently alkoxyl groups are present, they preferably contain 1 to 4 carbon atoms, but also, for example, 5 to 12 carbon atoms. The ester groups may contain any acyl radicals. Those of lower aliphatic acids, as for example of formic, acetic, propionic and butyric acids, are preferred.

Especially readily accessible for the purpose of the present invention are those 1,4-bis-styryl-benzenes which bear, on the middle benzene nucleus, no substituents other than the styryl groups and which have, on one or on both phenyl radicals of the styryl groups, one or two alkyl groups, a chlorine and a methyl group, a chlorine and a hydroxyl group, one or two hydroxyl groups, one or two etherified hydroxyl groups, or one or two esterified hydroxyl groups. As alkyl and alkoxy groups, the lower ones are preferred, especially methyl groups and methoxy groups. Two adjacent hydroxy groups may also be joined together by replacement of hydrogen by a methylene bridge. The larger the number of hydroxyl groups contained in the molecule of the 1,4-bis-styryl-benzenes, the more hydrophilic will they be. In contrast, 1,4-bis-styrylbenzenes which bear only alkyl radicals in the molecule are more hydrophobic. If the alkyl radicals are very long, the 1,4-bis-styryl-benzenes are especially hydrophobic. The enumeration of the possibilities for the substitution of the 1,4-bis-styryl-benzenes used for this invention is merely by way of example and not complete since other substituents may also be present. Thus for example the phenyl radicals of the styryl groups may be substituted by further phenyl radicals, which moreover may be connected with each other by a substituted or unsubstituted nitrogen bridge. A bis-carbazole derivative of para-divinylbenzene is then present (see Example 6).

The homogeneously optically brightened macromolecular organic substances may include polyaldehydes, such as polyformaldehyde; polyesters, such as condensation products of di- and higher polycarboxylic acids, as for example carbonic acid, succinic acid, terephthalic acid, and di- or higher polyhydric alcohols, such as ethylene glycol, butane-diol, diphenylol acetone; casting resins derived from vinyl compounds, such as styrene and unsaturated polyesters; unsaturated polyesters consisting for example of alpha,beta-unsaturated dicarboxylic acids, for example maleic acid, fumaric acid, itaconic acid and chlormaleic acid and preferably dihydric saturated alcohols, such as glycol, butane-diol, propane-diol; aliphatic saturated dicarboxylic acids, for example succinic acid, adipic acid, suberic acid, sulfonic-dibutyric acid, phthalic acid and tetra-chlorphthalic acid may additionally be esterified in; polymers, for example of styrene, methylstyrene, halogenstyrenes, vinylnaphthalene, vinylpyridine, N-vinylcarbazole, of unsaturated ketones, such as vinyl methyl ketone, or of vinyl esters, such as vinyl acetate or vinyl propionate, of vinyl lactams, such as N-vinylpyrrolidone, of vinyl chloride, vinylidene chloride, vinylidene cyanide, of vinyl ethers, such as vinyl ethyl ether and vinyl isobutyl ether; also polymers of alpha,beta-unsaturated mono- and dicarboxylic acids and their derivatives, such as esters, amides, nitriles, for example acrylic acid, methyl acrylate, ethyl acrylate, butyl acrylate, acrylamide, acrylonitrile, methacrylic acid, methyl methacrylate, methacrylamide, methacrylonitrile, methyl alpha-chloracrylate, maleic anhydride, diethyl maleate, of allyl compounds, for example allyl acetate, allyl acrylate, diallyl phthalate, of dienes, such as butadiene, isoprene, dimethylbutadiene, cyclopentadiene and chloroprene; polyolefines, as for example polyethylene, polypropylene and polyisobutylene; polycondensation products, as for example of urea, melamine, dicarboxylic acid diamides or guanidine and formaldehyde. Polyolefines and copolymers of olefines and other polymerizable compounds are preferred according to this invention.

They may also be copolymers and mixtures of said substances. Synthetic macromolecular organic compounds within the purport of the present invention are meant to include those which have been obtained by chemically combining a great variety of low molecular weight compounds to form compounds of high molecular weight. These polymerizable low molecular unsaturated compounds can be chemically combined by polymerization. When polyesters are obtained the recurring elements are linked by —COO— groups. The macromolecular substances may also be natural or modified natural products, such as cellulose film, cellulose acetate, cellulose butyrate, rubber, and chlorinated rubber. The above-mentioned synthetic macromolecular substances can be referred to as polymerization products if the macromolecule has been obtained by polymerization, it being understood that the term polymerization products includes monopolymers and comonomers. They can be referred to as linear polyester condensation products if the macromolecule has been obtained from bis-hydroxyl compounds and dicarboxylic acids or the esters of the latter. They can be referred to as polyester resins if the macromolecule has been obtained by both polyester condensation and polymerization. These resins can be used for the production of moldings and as varnishes. Epoxy resins, such as are obtainable from bis-hydroxyphenyl compounds and epoxy compounds may also be used for varnish making. Varnishes of modified natural compounds are those obtained from nitrocellulose.

The optical brightening agent is added to and therefore contained in the above-mentioned macromolecular compounds in an amount of 0.001 to 0.1% by weight with reference to the macromolecular substance. Mixtures of different brighteners may also be used. The optical brightening agents are generally far superior in brightening power to those previously known. It is thus possible to obtain the desired effects by using about 0.1 to 0.0001% by weight of an optical brightening agent in accordance with our invention, percentages with reference to the macromolecular end product. Instead of using the term "optical brightening agents" we may also in the meaning of the present invention refer to these agents as "optical bleaches."

Polymerization products from polymerizable unsaturated compounds, such as polyvinylchloride, polystyrene, polyacrylonitrile, polyacrylic esters, polymethacrylic esters; copolymers from two or more of the monomers vinyl chloride, vinylidene chloride, a styrene, acrylonitrile, an acrylic ester, a methacrylic ester, acrylic acid amide, methacrylic acid amide; polyolefines from ethylene, propylene and mixtures thereof; polymerization products from diolefines, such as butadiene; polyester resins, epoxy resins, polyformaldehyde and linear polyesters may have added to them an optical brightening agent in accordance with our invention in an amount of from 0.001 to about 0.1% by weight, percentage with reference to the macromolecular compound.

The molecular weights of the macromolecular substances adapted for use in the practice of our invention are known to anyone skilled in the art. Moreover they are frequently specified in the literature concerning the chemistry of plastic compositions and plastics. It is therefore not necessary for the proper understanding of the invention to give numerical examples of the molecular weights of those macromolecular substances which fall within the scope of the present invention.

Polyamides, such as polycaprolactam, polyoenanthic lactam, polycaprlylic lactam, polylauryl lactam and polyamides derived from adipic acid, suberic acid, heptadecane dicarboxylic acid with hexamethylene diamine, octamethylene diamine or xylylene diamine, in which the recurring elements are linked by —CONH— or —CON< groups should contain not more than 0.009% by weight of an optical brightener, percentage with reference to the weight of the polyamide; if the 1,4-bis-styryl-benzene used as the optical brightener contains as a substituent a hydroxy group, an alkoxy group, an acyloxy group, a dioxymethylene group, chlorine and/or bromine.

The bleaches may be added prior to the polymerization of the polymerizable monomers and are then already present during the polymerization which may be carried out as bulk, solution, suspension or emulsion polymerization. The bleaches may however be incorporated subsequently in the macromolecular substance, for example in mixers, such as tumbler mixers, drum mixers, ribbon mixers or turbine mixers, in kneaders, in extruders with one or more screws or on mixing rollers.

For the incorporation of the optical bleaches into synthetic macromolecular products, such as polyacrylonitrile, there are suitable, for example their solutions from which after mixing with the optical bleach the solvent is withdrawn. With thermoplastic high molecular weight compounds, as for example polyolefines, the optical bleaches may be incorporated also for example by calendering, preferably in the form of so-called "master batches." These concentrates may be obtained from the optical bleaches and the monomers in the way specified above. The optical bleaches may also be worked into latices or crude rubber.

The optically brightened macromolecular substances may contain plasticizers and other additives, as for example fillers.

Melts or solutions of thread-forming and film-forming macromolecular substances for spinning purposes may also have the optical bleaches incorporated therein.

The macromolecular substance containing the bleach may be processed into a great variety of forms and shapes, such as threads, fibers, foils, plates, tubes, injection or extrusion moldings and coatings.

As compared with known bleaches, the optical bleaches herein described have the advantage that they are stable at the polymerization and processing temperatures. They do not crystallize out in the macromolecular products and cannot be dissolved out therefrom. Even bleaches which are not insoluble in water give an optical whitening effect which is resistant to laundering. The fastness to light is also very good. Even upon prolonged influence of sunlight on the macromolecular products according to this invention, no reaction products causing yellowing are formed from the optical brightening compounds. Moreover, some of the said styryl-stillbenes, for example 1,4-bis-(3-methoxy-4′-hydroxystyryl)-benzene, have the further advantage of producing not only the optical brightening effect but also a stabilizing effect, for example on polyolefines and polyformaldehyde.

The optical bleaches are readily accessible. They may be prepared for example according to the method of the ylide synthesis from terephthalaldehydes of the general formula:

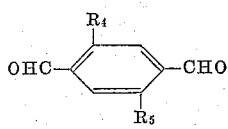

and benzyl halogen derivatives of the general formula:

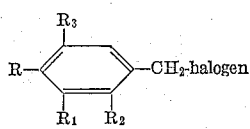

with the aid of triarylphosphines and proton acceptors according to the following reaction scheme explained in respect of terephthalaldehyde, 3,4-dioxymethylene benzyl bromide, triphenylphosphine and sodium alcoholate:

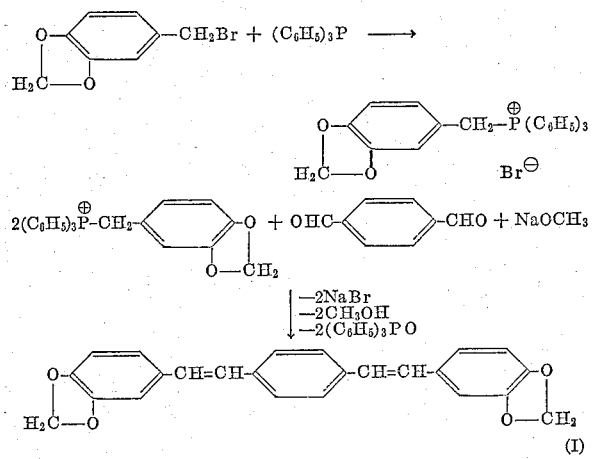

The following is an example of this reaction:

21.0 parts by weight of 3,4-dioxymethylene benzyl bromide and 27.0 parts by weight of triphenylphosphine are stirred for an hour in 100 parts by volume (relation between parts by volume and parts by weight being the same as between the liter and the kilogram) of dimethyl formamide, then heated to 60° C. for half an hour. To the resultant solution of 3,4-dioxymethylene-benzyl-triphenylphosphonium bromide there are added 6 parts by weight of terephthal-dialdehyde and then 20 parts by weight of a 30% solution of sodium methylate in methanol are allowed to flow in slowly. 1,4-bis-(3′,4′-dioxymethylenestyryl)-benzene (I) is precipitated in greenish yellow leaflets. After recrystallization from dimethylformamide, 25 parts by weight of the compound are obtained. The melting point is 264° to 266° C.

1,4 - bis - (2′,4′ - dimethoxy - styryl) - benzene is obtained according to the following example:

23 parts by weight of 2,4-dimethoxy-benzyl bromide are gradually added to a solution of 27 parts by weight of triphenyl phosphine in 100 parts by volume (parts by volume:parts by weight=liter:kilogram) of dimethylformamide. The whole is stirred for an hour and then heated to 60° C. for half an hour. 6 parts by weight of terephthalic dialdehyde are added to the reaction mixture and then 20 parts by weight of 30% solution of sodium methylate in methanol are slowly run in. After half an hour, the precipitated compound is isolated and recrystallized from dimethylformamide. 23 parts by weight of 1,4-bis-(2′,4′-dimethoxy-styryl)-benzene (II) are obtained in the form of greenish yellow leaflets of the melting point 185° to 187° C.

Further examples are:

19 parts by weight of 3,4-dichlorbenzyl chloride are added to a solution of 27 parts by weight of triphenylphosphine in 100 parts by volume (parts by volume:parts by weight=liter:kilogram) of dimethylformamide. The whole is stirred for an hour and then heated for an hour at 100° C. 6 parts by weight of terephthalic dialdehyde are thereafter added to the reaction mixture and then 20 parts by weight of a 30% solution of sodium methylate in methanol are slowly run in. The precipitated compound is separated and recrystallized from dimethylformamide. 32 parts by weight of 1,4-bis-(3′,4′-dichlorstyryl)-benzene (III) are obtained as greenish yellow crystals of the melting point 211° to 213° C.

40 parts by weight of triphenyl-benzyl-phosphonium chloride and 20 parts by weight of 2,5-dichlorterephthalic dialdehyde are dissolved in a mixture of 50 parts by volume of dimethylformamide and 50 parts of methanol (parts by volume:parts by weight=liter:kilogram). Then 20 parts by weight of 30% solution of sodium methylate in methanol are gradually run in, stirred for an hour and the precipitated compound separated off. By recrystallization from dimethylformamide there are obtained 24 parts by weight of 1,4-bis-styryl-2,5-dichlor-benzene (IV) in the form of greenish yellow crystals of the melting point 205° to 207° C.

In a corresponding way, optical bleaches may also be obtained by reaction of one mol each of two different benzyl halides with one mol of a terephthalaldehyde.

Some of the preferred 1,4-bis-styryl-benzenes falling within the scope of this invention are listed in the following table:

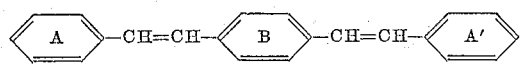

| Substitution of A | Substitution of A′ | Substitution of B |
|---|---|---|
| 2′-methyl. 3′-methyl. 4′-methyl. 3′,4′-dimethyl. 3′,4′-dioxy. 3′,4′-dimethoxy. 3′,4′-dioxymethylene. 2′,4′-dimethoxy. 2′,5′-dichloro. 3′,4′-dichloro. | Other than or same as A, symmetrically or unsymmetrically. | Methoxy. Methoxy. Preferably in 2- and 5- position. |

Generally speaking, at least one of the carbon atoms of the aryl groups in the above formula should be substituted by an atom different from H, however by no carboxyl groups or a derivative theerof, i.e., a carboxylic ester group, a carboxylicamide group or a nitrile group.

The production of homogeneously optically brightened macromolecular substances is illustrated in the following examples. Unless otherwise stated, parts and percentages are by weight.

*Example 1*

A film of rigid polyvinyl chloride is prepared by the following method:

A mixture of 100 parts of emulsion polyvinyl chloride ($k$-value 75), 4 parts of ethoxylated montanic acid and 0.5 part of diphenylthiourea is rolled out to a homogeneous sheet on a 2-roller mixing apparatus and then drawn out on a 4-roller calender to a film 0.1 mm. thick. To improve the mechanical properties, the film is thermally aftertreated at 250° C. for a short time.

The film thus prepared has a faint yellowish appearance; this is especially noticeable when the film is in several superposed layers, for example wound up into a roll.

Various amounts of 1,4-bis-(3',4'-dioxymethylene-styryl)-benzene (I) are worked in and the appearance assessed. The following table shows the results:

| No. | Percentage of bleach added | Color of individual film | Color of film in a roll |
| --- | --- | --- | --- |
| 1 | 0.001 | Almost colorless | Yellowish. |
| 2 | 0.005 | Colorless | Colorless. |
| 3 | 0.01 | Somewhat violet | Do. |

Example 2

A film of rigid polyvinyl chloride is prepared by the following method:

A mixture of 100 parts of emulsion polyvinyl chloride ($k$-value 75), 4 parts of ethoxylated montanic acid, and 0.5 part of diphenylthiourea is rolled to a homogeneous sheet on a 2-roller mixing machine and then drawn out on a 4-roller calendar to a film 0.1 mm. thick. To improve the mechanical properties, the film is thermally aftertreated at 250° C. for a short time.

The film thus prepared has a slightly yellowish appearance; this is especially noticeable when the film is in several superposed layers, as for example when rolled up into a roll.

Different amounts of 1,4-bis-(2',4'-dimethoxy-styryl)-benzene (II) are worked in and the appearance of the films assessed. The following table gives the results:

| No. | Percentage of bleach added | Color of individual film | Color of film in a roll |
| --- | --- | --- | --- |
| 1 | 0.001 | Almost colorless | Yellowish. |
| 2 | 0.005 | Colorless | Colorless. |
| 3 | 0.10 | Somewhat bluish | Do. |

Example 3

A film of rigid polyvinyl chloride is prepared as follows:

A mixture of 100 parts of emulsion polyvinyl chloride ($k$-value 75), 4 parts of ethoxylated montanic acid, and 0.5 part of diphenylthiourea is rolled to a homogeneous sheet on a 2-roller mixing apparatus and then drawn out to a film 0.1 mm. thick on a 4-roller calender. To improve the mechanical properties, the film is thermally aftertreated at 250° C. for a short time.

The film thus prepared has a slightly yellowish appearance; this is especially noticeable when the film is in several superposed layers, as for example as when rolled up into a roll.

Various amounts of 1,4-bis-(3',4'-dichlor-styryl)-benzene (III) are worked in and the appearance of the film is assessed. The following table gives the results:

| No. | Percentage of bleach added | Color of individual film | Color of film in a roll |
| --- | --- | --- | --- |
| 1 | 0.001 | Almost colorless | Yellowish. |
| 2 | 0.005 | Colorless | Colorless. |
| 3 | 0.01 | Somewhat blue-violet | Do. |

Example 4

A film of rigid polyvinyl chloride is prepared by the following method:

A mixture of 100 parts of emulsion polyvinyl chloride ($k$-value 75), 4 parts of ethoxylated montanic acid and 0.5 part of diphenylthiourea is rolled on a 2-roller mixing apparatus to a homogeneous sheet and then drawn out on a 4-roller calender to a film 0.1 mm. thick. To improve the mechanical properties, the film is thermally aftertreated for a short time at 250° C.

The film thus prepared has a pale yellowish appearance; this is especially noticeable when the film is in several superposed layers, as for example when rolled up into a roll.

Various amounts of 1,4-distyryl-2,5-dichlorbenzene (IV) are worked in and the appearance of the film is assessed. The following table gives the results:

| No. | Percentage of bleach added | Color of individual film | Color of film in a roll |
| --- | --- | --- | --- |
| 1 | 0.001 | Almost colorless | Yellowish. |
| 2 | 0.005 | Colorless | Colorless. |
| 3 | 0.01 | Somewhat violet | Do. |

Example 5

A mixture of 1.5% (with respect to polypropylene) of titanium dioxide powder and 0.005% of finely powdered 1,4-bis-(2',4'-dimethoxy-styryl)-benzene is dusted onto granulated polypropylene with a molecular weight of 185,000. The polymer is melted at 290° C. in a screw extruder and forced by means of a spinning pump through a sand filter and a spinneret with 30 openings each of 0.3 mm. diameter. The capacity is 10 grams per minute. The threads are taken off at a rate of 500 meters per minute, wound up and drawn at the ratio of 1:4.5 while hot. The whitening effect is very striking and stable.

Example 6

A mixture of 1.5% (with reference to polypropylene) of titanium dioxide powder and 0.005% of finely powdered omega,omega'-bis-(N-methyl-3-carbazolyl)-para-divinyl-benzene of the formula

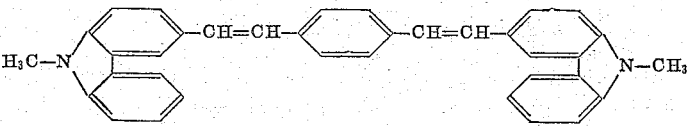

is dusted onto granulated polypropylene with a molecular weight of 185,000. The polymer is fused at 290° C. in a screw extruder and forced by means of a spinning pump through a sand filter and a spinneret with 30 openings each of 0.3 mm. in diameter. The capacity is 10 grams per minute. The threads are taken off at a rate of 500 meters per minute, wound up and drawn hot at the ratio 1:4.5. The whitening effect obtained is especially good and stable.

Example 7

Granulated polypropylene (intrinsic viscosity 2.0) is intimately mixed with a concentrate of 99% of polypropylene (intrinsic viscosity 2.0) and 1% of 1,4-bis-(3',4'-methylene-dioxystyryl)-benzene. Films having a thickness of 200 microns are prepared from mixtures of this kind by means of a single screw extruder provided with a slot die. The following effects are obtained, depending on the amount of bleach.

| Percent concentrate | Percent bleach | Appearance of the film |
|---|---|---|
| 0 | 0 | Pale brownish. |
| 0.01 | 0.0001 | Colorless. |
| 0.1 | 0.001 | Pale bluish. |
| 1.0 | 0.01 | Strong bluish fluorescence. |

*Example 8*

0.1%, 0.01% and 0.001% of 1,4-bis-(3',4'-dichlorstyryl)-benzene are added to a 20% solution of a copolymer derived from 70 parts of styrene and 30 parts of butyl acrylate in toluene, which is used as a lacquer. Lacquer films are cast on a white paper from the said solutions. These films exhibit the following appearance:

Without addition _____Brownish.
With 0.001% _____Pale brownish.
With 0.01% _____Almost colorless.
With 0.1% _____Blue-greenish.

*Example 9*

A film of rigid polyvinyl chloride is prepared by the following method:

A mixture of 100 parts of emulsion polyvinyl chloride ($k$-value 75), 4 parts of ethoxylated montanic acid, 0.5 part of diphenylthiourea and 4 parts of titanium dioxide (rutile type) are rolled on a 2-roller mixing aparatus to a homogeneous film and then drawn out to a film 0.15 mm. thick on a 4-roller calendar. To improve the mechanical properties, the film is thermally after-treated for a short time at 250° C.

The film thus prepared has a yellowish white shade.

If 0.005% of 1,4-bis-(2',4'-dimethoxy-styryl)-benzene be added to the mixture prior to working up, a film with a bluish white shade is obtained under otherwise the same conditions.

*Example 10*

A film of plasticized polyvinyl chloride is prepared by the following method:

A mixture of 70 parts of emulsion polyvinyl chloride ($k$-value 70), 30 parts of di-iso-octyl phthalate, 2 parts of titanium dioxide (rutile type) and 0.5 part of phenylurea is worked up to a homogeneous sheet on a 2-roller mixing apparatus and then drawn out to a film 0.1 mm. thick on a 4-roller calender.

The film thus prepared has a pale reddish yellow white shade, which is more noticeable after storing the film for 30 minutes at 150° C.

Flms containing various amounts of 1,4-bis-(2',4'-dimethoxy-styryl)-benzene are prepared under the same conditions and their appearance is compared with that of the film free from the addition, both before and after storage at 150° C. for 30 minutes. The following Table gives the results:

| Percentage of bleach added | Appearance of the film— | |
|---|---|---|
| | Prior to the storage | After 30 minutes at 150° C. |
| 0.000 | Reddish white shade. | Bluish white shade. |
| 0.002 | Pale reddish white shade. | Pale bluish white shade. |
| 0.010 | White. | Pale reddish white shade. |
| 0.050 | Cold white. | White. |

*Example 11*

Injection moldings (plates) are prepared from a sytrene copolymer by the folowing method:

A mixture of 100 parts of a copolymer derived from 70% of styrene and 30% of acrylonitrile, 2 parts of titanium dioxide (rutile type) and 1 part of butyl stearate is worked up by means of an extruder at 180° to 200° C. into a homogeneous mass and granulated. Plates are prepared from this granulate on an injection molding machine. These plates have a yellowish white shade. In contrast, mixtures which contain 0.01 part of 1,4-bis-(2',4'-dimethoxy-styryl)-benzene give plates which are free from the yellowish shade. With 0.02 part of the said additive, plates are obtained with a bluish white shade.

It appears from the foregoing examples, which are given for illustration only with no intention to restrict our invention thereto, that other macromolecular substances, such as linear polyester resins, linear polyesters, epoxy resins, polyformaldehyde, nitrocellulose lacquers, acrylonitrile polymers and acrylonitrile copolymers, polymers built up on the butadiene basis and a variety of other polymers can also be homogeneously optically brightened with the agents according to our invention. If not crosslinked the macromolecular substances have a $k$-value of between about 20 and 150 when used for making lacquers and varnishes, and a $k$-value of between about 40 and 150 when not so used for lacquers and varnishes. Any expert is aware of the fact that the $k$-value of cross-linked products cannot be determined for physical reasons.

*Example 12*

Granulated poly-$C_8$-lactam (a polyamide from caprylic lactam, $k$-value 70) is mixed with a concentrate of 99% of poly-$C_8$-lactam and 1% of 1,4-bis-(paramethylstyryl)-benzene. From mixtures of this kind 150 micron films are prepared by means of a single screw extruder provided with a slot die. The following effects result, depending on the amount of bleach.

| Percent concentrate | Percent bleach | Appearance of the film |
|---|---|---|
| 0 | 0 | Pale brownish. |
| 0.1 | 0.001 | Colorless. |

This application is a continuation-in-part of our application Serial No. 43,988, filed July 20, 1960, now abandoned.

We claim:

1. An optically brightened synthetic substance selected from the group consisting of macromolecular polymerization products of polymerizable unsaturated compounds, macromolecular linear polyesters and mixtures of said macromolecular substances in which there is homogeneously distributed as a brightening agent, in an amount sufficient to optically brighten said substance, the compound 1,4-bis-styryl-benzene in which from one to two of the positions 2', 3', 4', and 5' of at least one of the two phenyl nuclei corresponding to the styryl moiety bear a radical selected from the group consisting of lower alkyl, phenyl, hydroxy, lower alkoxy, lower acyloxy, chlorine, bromine and dioxymethylene.

2. An optically brightened synthetic substance as claimed in claim 1 wherein there is homogeneously distributed from 0.0001 to 0.1% by weight of said brightening agent.

3. An optically brightened synthetic substance as claimed in claim 2 wherein the brightening agent is lower alkyl substituted 1,4-bis-styryl-benzene.

4. An optically brightened synthetic substance as claimed in claim 2 wherein the brightening agent is chlorine substituted 1,4-bis-styryl-benzene.

5. An optically brightened synthetic substance as claimed in claim 2 wherein the brightening agent is dioxymethylene substituted 1,4-bis-styryl-benzene.

6. An optically brightened synthetic substance as claimed in claim 2 wherein the brightening agent is lower alkoxy substituted 1,4-bis-styryl-benzene.

7. An optically brightened synthetic substance as claimed in claim 2 wherein said substance is a polyolefine.

8. An optically brightened synthetic substance as claimed in claim 7 wherein the brightening agent is 1,4-bis-(3',4'-dioxymethylenestyryl)-benzene.

9. An optically brightened synthetic substance as claimed in claim 7 wherein the brightening agent is 1,4-bis-(2',4'-dimethoxystyryl)-benzene.

10. An optically brightened synthetic substance as claimed in claim 7 wherein the brightening agent is 1,4-bis-(3',4'-dimethoxystyryl)-benzene.

References Cited by the Examiner
UNITED STATES PATENTS

| | | | |
|---|---|---|---|
| 2,527,427 | 10/50 | Keller et al. | 260—507 |
| 2,547,910 | 4/51 | Hausermann et al. | 260—507 |
| 2,995,564 | 8/61 | Duennenberger et al. | 252—301.2 |
| 3,074,963 | 1/63 | Siegel et al. | 252—301.2 |

MAURICE A. BRINDISI, *Primary Examiner.*